3,338,948
PHOSPHORUS COMPOUNDS CONTAINING ARYL-
SULFO ACID GROUPS AND PROCESS FOR PRE-
PARING THEM
Ernst Hieronymus and Rudolf Wirtz, Frankfurt am Main,
Germany, assignors to Farbwerke Hoechst Aktiengesell-
schaft vormals Meister Lucius & Bruning, Frankfurt
am Main, Germany, a corporation of Germany
No Drawing. Filed Nov. 5, 1963, Ser. No. 321,397
Claims priority, application Germany, Nov. 6, 1962,
F 38,235
6 Claims. (Cl. 260—456)

The present invention relates to phosphorus compounds containing arylsulfo acid groups and to a process for preparing the said compounds.

It is known to prepare compounds containing sulfo acid groups as well as phosphonic or phosphinic acid groups by reacting esters of the acids of trivalent phosphorus with alkane sultones. However, in these compounds the sulfo acid groups as well as the phosphonic or the phosphinic acid groups are linked to aliphatic carbon atoms.

Furthermore, the preparation of p-sulfoamido benzene phosphonic acid has been described. In this compound the sulfonamido group as well as the phosphonic acid group are linked to the aromatic ring.

It has also been known that alkyl halides can be reacted with triesters of phosphorous acid, diesters of phosphonous acids and esters of phosphinous acids. After the alkyl halide, the alkyl group of which is derived from the ester group of the corresponding phosphorus compound, is split off and after the phosphorus atom has passed from the trivalent into the pentavalent stage, there are obtained phosphonic acid esters, phosphine acid esters or phosphinic oxides. However, this reaction known as "Arbuzow reaction" hitherto has not been carried out with aralkyl halides or aryl hydroxyalkyl halides the aromatic nucleus of which contain a sulfo acid ester group. It could not be expected that in this special case the reaction would proceed according to Arbuzow, because it can be concluded from the more recent literature that, for example, trialkyl phosphites also react with esters of aromatic sulfo acids. When, for example, p-toluene sulfo acid ethyl ester reacts with triethyl phosphite even catalytic quantities of the sulfo acid ester are sufficient to transform the triethyl phosphite quantitatively into ethyl phosphonic acid diethyl ester. (Journ. Amer. chem. soc. 76 (1954), page 4172.)

It was, therefore, surprising to find that triesters of phosphorous acid, diesters of phosphonous acids and esters of phosphinous acids react with arylalkyl halides or aryl hydroxyalkyl halides the aryl nuclei of which carry one or more sulfo acid ester groups, while splitting off organic halide according to Arbuzow, to yield phosphonic acid esters, phosphine acid esters or phosphinic oxides the phosphorus atom of which is linked to an aliphatic carbon atom and the sulphur atom to an aromatic carbon atom, the reaction proceeding without difficulties and with good yields.

The phosphorous, phosphonous and phosphinous acid esters used as starting material are of the formula

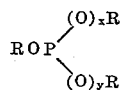

in which R represents aliphatic, cycloaliphatic, araliphatic or aromatic hydrocarbon radicals being substituted, if desired, by inert substitutents and containing preferably 1–18 carbon atoms. There are preferred alkyl and chloralkyl radicals having 1–18, particularly 1–8 carbon carbon atoms, $x$ represents one of the numbers 0 and 1, $y$ represents one of the numbers 0 and 1 and $x+y$ represent one of the numbers 0, 1 and 2.

There are particularly suitable trialkyl phosphites such as trimethyl phosphite, diethyl methyl phosphite, triethyl phosphite, tripropyl phosphite, triisopropyl phosphite, tri-n-butyl phosphite, tri-tertiary-butyl phosphite, tri-isoamyl phosphite, trihexyl phosphite, tris-(2-ethylhexyl)-phosphite, tri-n-octyl phosphite, tridodecyl phosphite, tri-hexadecyl phosphite, tris-(β-chloroethyl)-phosphite, tris-(β-cyanoethyl)-phosphite, cyclic phosphite esters such as ethylene methyl phosphite; alkenyl phosphites such as (1-methyl-3-pentenyl)-diethyl phosphite; triaryl phosphites such as triphenyl phosphite, tri-p-tolyl-phosphite; mixed alkyl aryl phosphites such as diphenyl ethyl phosphite, diethyl phenyl phosphite; phosphonous acid esters such as ethyl phosphonous acid dimethyl ester, ethyl phosphonous acid diethyl ester, ethyl phosphonous acid dihexylester, ethyl phosphonous acid methylphenyl ester, dodecyl phosphonous acid diethyl ester, cyclohexyl phosphonous acid di-ethyl ester, phenyl phosphonous acid diethyl ester; phosphinous acid esters such as diethyl phosphinous acid methyl ester, diethyl phosphinous acid hexyl ester, diethyl phosphinous acid-p-bromophenyl ester, di-phenyl phosphinous acid ethyl ester, dibenzyl phosphinous acid amyl ester, and the like.

The arylalkyl halides and the aryl hydroxy alkyl halides containing sulfo acid ester groups which are reacted according to the present invention are compounds of one of the following formulae:

wherein R′ represents a hydrocarbon radical with 1 to 18 carbon atoms, preferably 1 to 8 carbon atoms. Ar represents a radical of an aromatic hydrocarbon such as benzene, naphthalene, anthracene and phenanthrene, preferably a radical derived from benzene and naphthalene. A represents a radical of an aliphatic hydrocarbon preferably with 1 to 18 carbon atoms and more preferably with 1 to 12 carbon atoms and X represents a halogen preferably linked to a $CH_2$ group and said halogen, preferably being chlorine or bromine, $n$ represents one of the numbers 1, 2 and 3, preferably 1, and $m$ represents one of the numbers 1, 2 and 3, preferably 1. The aromatic hydrocarbon radical may carry further substituents provided that these substituents are inert under the reaction conditions, for example alkyl groups, especially those with up to 6 carbon atoms, aryl groups, especially phenyl and naphthyl groups, fluorine, chlorine or bromine atoms, cyano groups, amino groups, dialkyl amino groups, nitro groups, hydroxyl groups, ether groups, carboxyl groups, esterified carboxyl groups and the lilke. The aliphatic hydrocarbon radical carrying the halogen atom and containing preferably 1–18, and more preferably 1–12 carbon atoms, can be straight-chained or branched and it may also contain double bonds. This radical may be linked by means of an oxygen atom to the aromatic nucleus and/or it may be interrupted by oxygen atoms. Furthermore, it may also carry one or more of the above mentioned groups which are inert under the reaction conditions, but it should only contain altogether one aliphatically bound halogen atom. The aliphatic hydrocarbon radical may be substituted by further aromatic rings which, for their part, may contain sulfo acid ester groups.

The following arylalkyl halides and aryl hydroxy alkyl halides carrying sulfo acid ester groups at their nucleus can be mentioned by way of example for use in the present process:

1-chloromethylbenzene-sulfo acid-(4)-ethyl ester,
1-chloromethylbenzene-sulfo acid-(4)-butyl ester,
1-chloromethylbenzene-sulfo acid-(3)-ethyl ester, 1-chloromethyl-2-chlorobenzene - sulfo acid - (4) - ethyl ester,
1-chloromethyl-2-chlorobenzene - sulfo acid-(4)-phenyl ester,
1-chloromethyl-2-chlorobenzene - sulfo acid-(5)-methyl ester,
1-chloromethyl-2-chlorobenzene - sulfo acid-(5)-isopropyl ester,
1-($\beta$-bromoethyl)-benzene-sulfo acid-(4)-ethyl ester,
1-($\beta$-bromomethyl)-4-methoxybenzene - sulfo acid-ethyl ester,
2-chloromethyl-naphthalene-sulfo acid-(8)-methyl ester,
1-($\beta$-chlorethoxy)-naphthalene sulfo acid-(4)-ethyl ester,
1-($\beta$-chlorethoxy)-benzene sulfo acid-(4)-ethyl ester,
2-($\beta$-chlorethoxy)-ethylbenzene-p-sulfo acid ethyl ester,
1-($\gamma$-chloropropoxy) - naphthalene-sulfo acid-(4)-methyl ester,
1-($\gamma$-chloropropoxy)-naphthalene - sulfo acid - (4) - ethyl ester,
1-($\beta$-bromethoxy)-naphthalene-sulfo acid-(4)-ethyl ester,
1-($\beta$-bromethoxy)-3 - methylnaphthalene - sulfo acid-4-ethyl ester, These sulfo acid esters can be prepared from the sulfo acid halides from which they are derived by reacting them with sodium alcoholates. The sulfo acid halides can be obtained, for example, by halogenation of the corresponding alkylaryl sulfo acid halides according to German Patent 234,913 or by sulfo chlorination of the corresponding aralkyl halides with chlorosulfo acid according to U.S. Patent 2,618,655.

According to the invention a mixture of the sulfoaryl compound and of the ester of the trivalent phosphorus is heated. In some cases it may be of advantage, for obtaining good yields, to use the organophosphorus compound in excess, for example up to 5 mols per mol of sulfo arylalkyl halide. On the other hand, also the ester of the sulfo arylalkyl halide may be used in excess, for example 2 mols of sulfo arylalkyl halide per mol of the ester of trivalent phosphorus. According to the nature of the ester used, there is split off during the reaction alkyl halide, cycloalkyl halide, aralkyl halide or aryl halide which is removed from the reaction zone preferably continuously, for example by distillation. If the halide split off during the reaction is volatile and does not remain in the reaction mixture, but distills out of it, the end of the reaction can easily be ascertained by the fact that the formation of halide decreases or entirely ceases. In general, the reaction is terminated after a period of half an hour to several hours. The reaction product obtained substantially consists of the desired compound containing aryl sulfonyl groups of pentavalent phosphorus in a completely esterified form. However, it may also contain, entirely or partially the organic halide split off during the reaction, according to its volatility at the respective reaction temperature, and, if desired, unreacted starting materials. Furthermore, the reaction product contains admixtures of products having formed by the reaction of the sulfo ester group with the organo-phosphorus compound.

The reaction mixture can be worked up in the usual manner, for example by distillation.

The reaction temperature may vary within wide limits, i.e. between room temperature, i.e. 20° C. as lower limit and as upper limit the temperature at which decomposition of the reactants is just avoided, for example 300° C.

The reaction is carried out preferably in a temperature range of from 100–200° C. In certain cases there can be preferred working at temperatures outside of this range, for example at room temperature or at a temperature above 200° C.

The reaction can also be carried out in the presence of anhydrous solvents. There are suitable for this purpose all solvents, inert under reaction conditions, which are liquid at the reaction temperature and in which the starting materials are soluble. Suitable solvents are, for example, aliphatic and aromatic hydrocarbons such as higher boiling gasoline mixtures, benzene, toluene, xylenes, furthermore halogenated aromatic hydrocarbons, such as chlorobenzene, o- and m-dichlorobenzene, ethers such as dioxane or tetrahydrofurane. Solvents are required especially when the starting materials are present in the solid form.

The reaction is preferably carried out at atmospheric pressure. But it can also be executed under elevated pressure, for example 3 atmospheres gauge, or at reduced pressure, for example =0.1 mm./Hg. The application of elevated pressure is particularly necessary when the boiling points of the products or of the solvents used are below the reaction temperature.

The products obtained by the process of the present invention first in a completely esterified form are new substances and can be represented by the following general Formulae I or II:

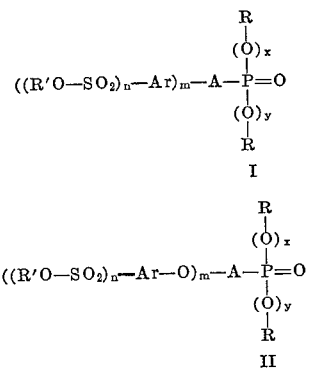

In these formulae Ar represents an aryl radical substituted, if desired, by groups inert under the reaction conditions, A represents an $m+1$ valent radical straight-chained, branched or unsaturated aliphatic hydrocarbon radical which may be substituted by groups inert under the reaction conditions and which contains preferably 1–18 and more particularly 1–12 carbon atoms that may be interrupted by oxygen atoms, R' means a hydrocarbon radical, the two R represent analogous or different, if desired, substituted hydrocarbon or chlorophenyl radicals. The radicals R' and R are preferably aliphatic hydrocarbon radicals having 1–18 and particularly 1–8 carbon atoms. $n$ means one of the numbers 1, 2 or 3 and preferably 1. $m$ means one of the numbers 1, 2 and 3 and preferably 1. $x$ represents one of the numbers 0 and 1, $y$ represents one of the numbers 0 and 1 and $x+y$ represents one of the numbers 0, 1 and 2.

In the triethyl ester of the benzyl phosphonic acid-p-sulfo acid obtained from 1-chloromethyl benzene-sulfo acid (4)-ethyl ester and triethyl phosphite according to the equation

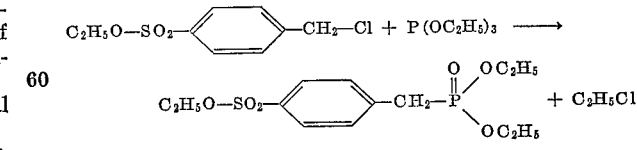

III

Ar means phenylene, A represents methylene, Rs, $m$, $x$, and $y$ are ethyl, and the two R are ethyl and $n$ is 1 according to Formula I.

The esterified products of Formulae I and II can be converted entirely or partially by suitable known measures to form the acids from which they are derived and they can be transformed into the salts or into other derivatives thereof such as acid halides, acid amides or other acid esters. For this purpose it is not necessary, in general, to isolate the esterified product from the reaction mixture.

The ester III can thus be transformed, for example, into the free p-sulfo benzyl phosphonic acid or its salts. By reaction of ester III with the equimolar quantity of sodium alcoholate, the monosodium salt of the p-sulfo benzyl phosphonic diethyl ester is obtained. The free p-sulfo benzyl phosphonic acid or its esters can be transformed with acid halides, for example with thionyl chloride or phosphorus pentachloride, into their acid halides. Acid amides can be obtained from the acid halides by means of ammonia or amines; other esters can be obtained from the acid halides by means of alcohols and phenols. These secondary reactions are, of course, possible with each of the products obtained according to the invention.

The products obtained according to the present process are novel and may serve as intermediate products for the manufacture of pharmaceutical products and pesticides. Products in which at least one ester group has been transformed into the free acid or the salts thereof, particularly the alkali metal salts, are of special importance. These products are water-soluble and can be used for preparing polyesters. Furthermore, they are surface-active, particularly when containing long chain aliphatic residues, and they are suited as emulsifiers and detergents.

The following examples illustrate the present invention without limiting it thereto.

Example 1

In a flask provided with a stirrer, a reflux condenser, a gas inlet tube, a thermometer and a dropping funnel there was heated a mixture consisting of 234.5 g. (1 mol) of benzyl chloride-p-sulfo acid ethyl ester and 249 g. (1.5 mol) of triethyl phosphite while stirring and passing through a weak current of nitrogen. The ethyl chloride formed was condensed in a cooling trap. When the temperature inside the flask had reached 155–160° C., a violent reaction set in, in the course of which the temperature rose to about 200° C. without further supply of heat, the mixture boiling under reflux. When the reaction slackened the principal amount of the ethyl chloride to be expected had condensed in the cooling trap. The temperature was maintained at 150°–160° C. for a further 3 hours. Subsequently unreacted triethyl phosphite and ethyl phosphonic acid diethyl ester, which had formed as by-product, were removed by distillation in vacuo. There were obtained 316 g. of a liquid residue consisting of 256.5 g. (0.76 mol) of the triethyl ester of benzyl phosphonic acid-p-sulfo acid (90.4% of the theory, calculated on converted benzyl chloride-p-sulfo acid-ethyl ester); 37.6 g. (0.16 mol) of unreacted benzyl chloride-p-sulfo acid ethyl ester; and 21.9 g. of by-products.

In the cooling trap there had condensed 49.3 g. (0.76 mol) of ethyl chloride.

For transforming the triethyl ester obtained into the monosodium salt it was not necessary to isolate the triethyl ester from the reaction product. However, for preparing a very pure, crystalline final product a treatment with aluminum oxide and active carbon is recommended.

For this purpose the reaction product (316 g.) was dissolved in 250 cc. of absolute benzene and the solution was conducted through a column having a diameter of about 4 cm. and a length of 60 cm. which was filled with 350 g. of aluminum oxide "Brockmann." The solution was eluted with benzene, the extracted material was treated with 10 g. of active carbon, filtered and the benzene was distilled off from the solution being now completely clear and colorless. The residue was dissolved in 1.5 l. of absolute ethanol. A solution of 0.7 mol of sodium ethylate in 1 l. of absolute ethanol was dropped in while stirring at a temperature of 40° C. When the solution was dropped in nearly completely, the pH-value of the reaction mixture was determined and there was dropped in only so much of the remaining ethylate solution that a neutral or very weakly alkaline reaction was obtained. This reaction was maintained for 2 hours by dropping in, occasionally, if desired, further sodium ethylate solution. After some time there had formed a colorless precipitate. The mixture was stirred for altogether 4 hours at 40° C. and subsequently boiled for further 2 hours under reflux.

After cooling the precipitate was filtered off with suction and there were obtained first 36.1 g. of the sodium salt of benzyl chloride-p-sulfo acid. The filtrate was concentrated to about 1/10 of the initial volume, the Na-salt of the diethyl ester of the benzyl phosphonic acid-p-sulfo acid separated in fine needles. Yield: 152 g. (0.46 mol), i.e. more than 60%, calculated on benzyl phosphonic acid-p-sulfo acid triethyl ester.

The product melted at 242 to 244° C. (corrected) with decomposition. It had a good solubility in water, methanol, ethanol and was only little soluble in ether, acetone and benzene and had the following formula

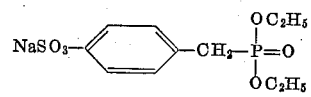

Analysis: $C_{11}H_{16}O_6PSNa$ (330.3). Calculated: C, 40.0%; H, 4.8%; P, 9.4%; S, 9.7%; Na, 7.0%; —$OC_2H_5$, 27.2%. Obtained: C, 40.2%; H, 4.9%; P, 9.5%; S, 9.7%; Na, 7.0%; —$OC_2H_5$, 27.1%.

Example 2

In an apparatus as described in Example 1 with the difference however, that the stirring flask instead of having a reflux condenser was provided with a descending condenser, a cooled receiver and was connected with a vacuum pump, there was heated to 150–155° C. under a reduced pressure of 20–70 mm./Hg for 28 hours a mixture consisting of 46.9 g. (0.2 mol) of benzyl chloride-p-sulfo acid ethyl ester and 66.8 g. (0.2 mol) of trihexyl phosphite in a nitrogen atmosphere while stirring. After 7, 14 and 21 hours there were added each time further 66.8 g. of trihexyl phosphite by means of the dropping funnel. While heating 25.8 g. of a liquid product consisting substantially of 1-chlorohexane had collected in the receiver. The reaction mixture was freed from volatile by-products by distillation under a pressure of 0.02 mm./Hg and a maximum flask temperature of 165° C.

The residue in the flask (137.9 g.) was dissolved in 125 cc. of dry benzene and this solution was conducted in the manner described in Example 1 through a column filled with 175 g. of aluminum oxide "Brockmann." The solution was eluted with benzene, the benzene solution was treated with 5 g. of active carbon, filtered and the benzene was distilled off.

The residue (117.5 g.) was dissolved in 450 cc. of absolute ethanol and there were dropped in at a temperature of 40° C., while stirring, 360 cc. of a sodium ethylate solution prepared from 4.6 g. (0.2 mol) of sodium and 450 cc. of absolute ethanol. The solution was stirred for further 2 hours at 40° C., and it was then allowed to boil for 5 hours under reflux. The solution had a pH-value of 8–9.

The small amount of precipitate obtained on cooling was separated. When concentrating the ethanol solution the sodium salt of the dihexyl ester of the p-sulfo benzyl phosphonic acid crystallized in fine needles. There were obtained from the mother liquor further quantities of the product by the addition of the same volume of absolute ether. Yield: 53.6 g. (60% of the theory, calculated on benzyl chloride-p-sulfo acid ethyl ester used). The product had the following formula:

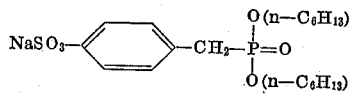

*Analysis:* (After recrystallization from ethanol)

(442). Calculated: C, 51.6%; H, 7.2%; P, 7.0%; S, 7.2%; Na, 5.2%. Obtained: C, 51.4%; H, 7.5%; P, 7.2%; S, 6.9%; Na, 5.3%.

The compound according to the invention decomposed at 242° C. (uncorrected) when heated, and was very well soluble in water, furthermore in methanol, ethanol, isopropanol, chloroform, glacial acetic acid (insoluble or very little soluble in petroleum ether), benzene, acetone, ether and carbon tetrachloride. The aqueous solution strongly foamed. The substance, therefore, had surface-active properties. When adding a silver nitrate solution there was precipitated from the aqueous solution a crystalline silver salt which was soluble in hot water. The sparingly soluble barium salt was obtained by adding barium chloride solution.

Example 3

In the apparatus as described in Example 1 there were heated 70.4 g. (0.3 mol) of benzyl chloride-p-sulfo acid ethyl ester and 99.0 g. (0.5 mol) of phenyl phosphonous acid di-ethyl ester.

At 120° C. a violent reaction set in, so that temporary cooling was required in order to intercept the temperature rise at 130° C. When the reaction had slackened the heating was carried on and the temperature was maintained for 2 hours at 130° C. During this time there condensed in the cooling trap 14.8 g. (0.23 mol) of ethyl chloride. On cooling, the reaction product crystallized. It was filtered off with suction, suspended in 350 cc. of absolute ether and heated for 1 hour under reflux while stirring. After cooling the crystals were filtered off with suction, washed with ether and the filter residue was dried. There were obtained 71.5 g. (64.6% of the theory, calculated on benzyl chloride-p-sulfo acid ethyl ester used), of phenyl-p-sulfobenzyl-phosphinic acid-diethyl ester in the form of fine needles which melted at 110–110.5° C. It was soluble in methanol, ethanol, benzene, acetone, chloroform, glacial acetic acid, dioxane, and insoluble in petroleum ether, ether and water.

The compound had the following formula:

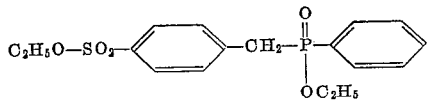

*Analysis:* $C_{17}H_{21}O_5PS$ (368). Calculated: C, 55.4%; H, 5.7%; P, 8.4%; S, 8.7%; $OC_2H_5$, 24.5%. Obtained: C, 55.8%; H, 5.7%; P, 8.2%; S, 9.2%; $OC_2H_5$, 24.6%.

There could be obtained by distillation from the combined filtrates after evaporation of the ether the phenyl-ethyl-phosphinic acid-ethyl ester formed as a by-product.

When the ethanol solution of the phenyl-p-sulfo-benzyl phosphinic acid-diethyl ester was treated with the equimolecular amount of sodium ethylate in ethanol in a manner such as described in Examples 1 and 2 there was obtained the monosodium salt of the phenyl-p-sulfobenzyl phosphinic acid-ethyl ester in needle shaped crystals in a yield of 88% of the theory. This compound had a good solubility in water and ethanol, but it was insoluble in petroleum ether, ether and benzene.

Example 4

In the apparatus used in Example 1 there were heated for 2½ hours at 130° C. 70.4 g. (0.3 mol) of benzyl chloride-p-sulfo acid ethyl ester and 116.3 g. (0.5 mol) of chlorophenyl phosphonous acid-diethyl ether.

In the cooling trap 12 g. (0.19 mol) of ethyl chloride condensed. After cooling, the reaction mixture was stirred with 250 cc. of petroleum ether (boiling range 40–80° C.) and the mixture was allowed to settle. There were formed 2 layers, the lighter petroleum ether layer being separated. After some time the reaction product crystallized out from the remaining phase. It was suspended in a little ether, filtered with suction and recrystallized from ethyl acetate. There were obtained 56.6 g. (=47% of the theory, calculated on benzyl chloride-p-sulfo acid ethyl ester used) of chloro-phenyl-p-sulfobenzyl-phosphinic acid-diethyl ester in the form of needle shaped crystals melting at 103–103.5° C. They were insoluble in water and petroleum ether, little soluble in ether, soluble in benzene, acetone, chloroform, ethanol, and methanol. The compound had the following formula:

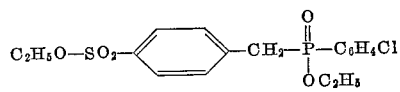

*Analysis:* $C_{17}H_{20}O_5PSCl$ (402.5). Calculated: C, 50.7%; H, 5.0%; P, 7.7%; Cl, 8.8%; $OC_2H_5$, 22.4%. Obtained: C, 50.9%; H, 5.2%; P, 7.7%; Cl, 8.9%; $OC_2H_5$, 23.0%.

Since the chlorophenyl-dichlorophosphine used as starting material for preparing the chlorophenyl phosphonous acid diethyl ester was prepared from chlorobenzene and phosphorus trichloride in the presence of aluminum chloride and consisted of approximately equal parts of o- and p-chlorophenyl dichlorophosphine, the reaction product represented a mixture of the o- and p-chloro compound.

By reacting the ethanol solution of the chlorophenyl-p-sulfobenzyl-phosphinic acid-diethyl ester with the equimolecular amount of sodium ethylate there was obtained in a yield of 83% of the theory, the monosodium salt of the chlorophenyl-p-sulfobenzyl-phosphinic acid-ethyl ester soluble in water and in alcohol.

Example 5

There were introduced into the apparatus described in Example 1 70.4 g. (0.3 mol) of benzyl chloride-p-sulfo acid ethyl ester and 95.0 g. (0.41 mol) of diphenyl phosphinous acid ethyl ester.

This mixture was carefully heated in a nitrogen atmosphere while stirring. At 100° C. a very violent reaction set in, in the course of which the temperature rose up to 200° C. in spite of outside cooling with ice water. During this reaction the reaction product precipitated in the form of a white crystalline mass. After having further stirred for half an hour at 130° C. there were added 350 cc. of p-xylene (dried over Na) and the mixture was boiled for 3 hours under reflux. After cooling it was filtered off with suction, the filtration residue was washed with ether and dried. There were obtained 88 g. (=77.3% of the theory, calculated on benzyl-chloride-p-sulfo acid ethyl ester used) of p-(ethoxysulfonyl)-benzyl-diphenyl-phosphine oxide. There had condensed in the cooling trap 14 g. of ethyl chloride.

After recrystallization from benzene the compound according to the invention was obtained in the form of colorless needles melting at 212.5° C. (uncorrected). They are insoluble in $H_2O$, sparingly soluble in ether and carbon tetrachloride, soluble to some degree in benzene and alcohol, well soluble in acetone and chloroform. The compound has the following formula:

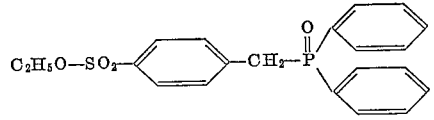

*Analysis:* $C_{21}H_{21}O_4PS$ (400). Calculated: C, 63.0%; H, 5.25%; P, 7.75%; S, 8.0%; $OC_2H_5$, 11.25%. Obtained: C, 63.1%; H, 5.3%; P, 7.5%; S, 8.2%; $OC_2H_5$, 11.2%.

The p-(ethoxysulfonyl)-benzyl - diphenyl - phosphine oxide can be transformed according to known methods into the free acid, i.e. into p-sulfobenzyl-diphenyl-phosphinic oxide or into its sodium salt. Both compounds are very well soluble in water.

We claim:
1. A compound of the formula

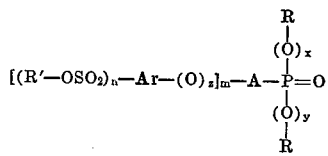

wherein R' represents hydrogen, an alkali metal, or alkyl having 1 to 18 carbon atoms, Ar represents phenyl, naphthyl, anthryl, or phenanthryl, which may be substituted by lower alkyl, phenyl, naphthyl, fluoro, chloro, bromo, cyano, amino, nitro, hydroxy, methoxy and carboxy, A represents alkylene having 1 to 18 carbon atoms, R represents alkyl or chloroalkyl having 1 to 18 carbon atoms, phenyl, p-tolyl, or chlorophenyl, $n$ and $m$ each represent 1, 2 or 3, and $x$, $y$ and $z$ each represent 0 or 1.

2. A compound of the formula

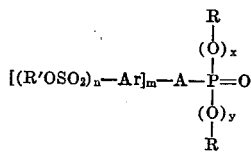

wherein R' represents alkyl having 1 to 18 carbon atoms or phenyl, Ar represents phenyl, naphthyl, anthryl, or phenanthryl, which may be substituted by lower alkyl, phenyl, naphthyl, fluoro, chloro, bromo, cyano, amino, nitro, hydroxy, methoxy and carboxy, A represents alkylene having 1 to 18 carbon atoms, R represents alkyl or chloroalkyl having 1 to 18 carbon atoms, phenyl, p-tolyl or chlorophenyl, $n$ represents 1, 2, or 3, $m$ represents 1, 2, or 3, $x$ represents 0 or 1, $y$ represents 0 or 1, and $x+y$ represent 0, 1, or 2.

3. A compound of the formula

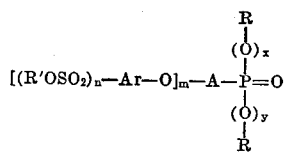

wherein R' represents alkyl having 1 to 18 carbon atoms or phenyl, Ar represents phenyl, naphthyl, anthryl, or phenanthryl, which may be substituted by lower alkyl, phenyl, naphthyl, fluoro, chloro, bromo, cyano, amino, nitro, hydroxy, methoxy and carboxy, A represents alkylene having 1 to 18 carbon atoms, R represents alkyl or chloroalkyl having 1 to 18 carbon atoms, phenyl, p-tolyl or chlorophenyl, $n$ represents 1, 2, or 3, $m$ represents 1, 2, or 3, $x$ represents 0 or 1, $y$ represents 0 or 1, and $x+y$ represent 0, 1, or 2.

4. A process for the manufacture of phosphorus compounds containing arylsulfo acid groups which comprises the step of reacting, at a temperature within the range of 20° C. to 300° C., 1 to 5 mols of a compound of the formula

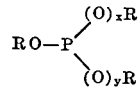

wherein R represents alkyl or chloroalkyl having 1 to 18 carbon atoms, phenyl, p-tolyl, or chlorophenyl, $x$ represents 0 or 1, $y$ represents 0 or 1, and $x+y$ represent 0, 1 or 2, with 1 to 2 mols of a compound of the formula

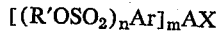

or

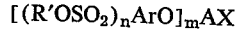

wherein R' represents alkyl having 1 to 18 carbon atoms or phenyl, Ar represents phenyl, naphthyl, anthryl, or phenanthryl, which may be substituted by lower alkyl, phenyl, naphthyl, fluoro, chloro, bromo, cyano, amino, dialkylamino, nitro, hydroxy, alkoxy, and carboxy, A represents alkylene having 1 to 18 carbon atoms, X represents chlorine or bromine, $n$ represents 1, 2, or 3, and $m$ represents 1, 2, or 3.

5. The process as claimed in claim 4, wherein the reaction is carried out at a temperature within the range of 100° C. to 200° C.

6. The process as claimed in claim 4, wherein equimolar amounts of the reactants are used.

References Cited

UNITED STATES PATENTS 3,134,800 5/1964 Kagan et al. _____ 260—456
3,155,711 11/1964 Szabo _____ 260—969 X
3,223,754 12/1965 Colln et al. _____ 260—969 X CHARLES B. PARKER, *Primary Examiner.*

F. D. HIGEL, *Assistant Examiner.*